United States Patent [19]
Balde

[11] 3,878,341

[45] Apr. 15, 1975

[54] INTERSTAGE LINKAGE FOR SWITCHING NETWORK

[75] Inventor: John William Balde, Raritan Township, Hunterdon County, N.J.

[73] Assignee: Western Electric Company, Incorporated, New York, N.Y.

[22] Filed: Oct. 11, 1973

[21] Appl. No.: 405,983

[52] U.S. Cl. ............ 179/98; 174/117 FF; 339/17 F
[51] Int. Cl. ............................................ H04q 1/06
[58] Field of Search.... 179/98; 317/101 CE, 101 CM; 339/17 CF, 17 F, 17 LM, 17 M; 174/117 F, 117 FF

[56] References Cited

UNITED STATES PATENTS

| | | | |
|---|---|---|---|
| 3,155,809 | 11/1964 | Griswold | 339/17 F |
| 3,573,704 | 4/1971 | Traver | 339/17 F |

*Primary Examiner*—Kathleen H. Claffy
*Assistant Examiner*—Gerald L. Brigance
*Attorney, Agent, or Firm*—B. W. Sheffield; J. L. Stavert

[57] ABSTRACT

An interstage linkage for a switching network wherein the necessary links are provided by flat cables connecting each input or output switch to a matrix board.

8 Claims, 6 Drawing Figures

INTERSTAGE LINKAGE FOR SWITCHING NETWORK

BACKGROUND OF THE INVENTION

1. Field of the Invention

This invention relates to electrical networks and, more particularly, to interstage linkages in multi-stage switching networks.

2. Description of the Prior Art

Multi-stage switching networks are well known in the communications field, particularly in the telephone industry. A typical telephone central office may contain large numbers of switches connected in networks to implement the connections necessary to complete telephone calls. A widely used switch is a two-dimensional array of electromechanically operated crosspoints known as a crossbar switch. A typical crossbar switch comprises 100 sets of crosspoints for connecting any of 10 input circuits to any of 10 output circuits. A circuit may comprise one or more separate wires or conductors; therefore, each crosspoint must comprise a contact for each wire. For example, what is typically known as a 10 × 10 three-wire switch comprises 100 crosspoints, each crosspoint having three normally open contacts.

Some of the more recently introduced electronic switching systems also use coordinate switches. For example, the Western Electric No. 1 ESS Electronic Switching System uses switches comprising dry-reed contacts arranged in a two-dimensional matrix and operated electromagnetically. Other two-dimensional coordinate switches are known in which the crosspoints are semiconductor switching devices. Still other two-dimensional coordinate switches are known in which the crosspoints comprise connecting plugs that can be inserted or removed manually. The latter switches are useful where connection changes are made relatively infrequently.

Switching networks typically comprise several stages of switches interconnected in a regular pattern. The design of a switching network is governed by the proposition that a connection between any input and any output must be realizable, but not all such connections need be made simultaneously. Therefore, various degrees of concentration are often used between stages of a switching network to minimize the number of crosspoints necessary. Such concentration raises the possibility that a clear path through a concentrated network may not always exist to complete a requested connection, in which case the request is "blocked."In properly designed switching networks, however, the probability of such blocking is low.

Interstage linkages connecting switching stages are usually fabricated by interconnecting terminals on the switches with hand-connected wiring. Since switching networks can be large, the number of manually installed connections required can result in high manufacturing costs. It would be desirable to reduce the cost of fabricating such networks by mechanization in the interconnection process. However, the nature of interstage linkages has frustrated attempts at mechanization because these linkages typically comprise conductors that connect one switch in a given stage to many switches in an adjacent stage. Therefore, the conductors cannot be conveniently grouped into unbranching cables or arrays for use with well-known mass termination techniques. Such techniques have been proved valuable for such uses as terminating conductors grouped in flat-flexible cables to arrays of terminals.

Others have attacked this problem by designing special coordinate switches that can be interconnected with unbranching multi-conductor cables. Such interconnected coordinate switches are shown, for example, in U.S. Pat. No. 2,901,547 and U.S. Pat. No. 3,699,295. As disclosed in these patents, the coordinate switches constitute three-dimensional configurations that inherently provide the necessary topological relationship for the interstage linkage when adjacent stages of the switches are connected by multi-conductor cables such as flat-flexible cables. However, that approach does not solve the problem for other more widely used two-dimensional switches, which are still preferred in view of the expense and incovenience of using three-dimensional switch structures.

The problem can be broadly stated as that of providing and interstage linkage using unbranching cables for interconnecting first and second stages of devices in which the first stage consists of $m$ devices each having $n$ output circuits and the second stage consists of $n$ devices each having $m$ input circuits, each circuit having $s$ terminals; and the interstage linkage consists of $m \times n$ $s$-wire links, each connecting the $s$ terminals of the $i^{th}$ output circuit of the $j^{th}$ device in the first stage to the corresponding $s$ terminals of the $j^{th}$ input circuit of the $i^{th}$ device in the second stage, where $1 \leq i \leq m$ and $1 \leq j \leq n$. The invention to be described provides a solution to this problem.

SUMMARY OF THE INVENTION

Broadly, an interstage linkage for interconnecting stages of switches in a switching network comprises first flat cables, each connected at one end to output terminals on a first-stage switch, second flat cables, each connected at one end to input terminals on a second-stage switch, the remaining ends of the first cables being stacked parallel to a first plane, the remaining ends of the second cables being stacked opposite the first cables and parallel to a second plane perpendicular to the first plane, the conductors in the second cables being connected end-to-end to adjacent corresponding conductors in the first cables. More particularly, a matrix board having arrays of terminals on opposing surfaces interconnects the first and second cables, the terminals being contact pads for flat-conductor cables. The terminals are arranged in groups on the matrix board, each group having a number of terminals corresponding to the number of wires in the circuits being carried through the linkage.

DETAILED DESCRIPTION

Figure 1:
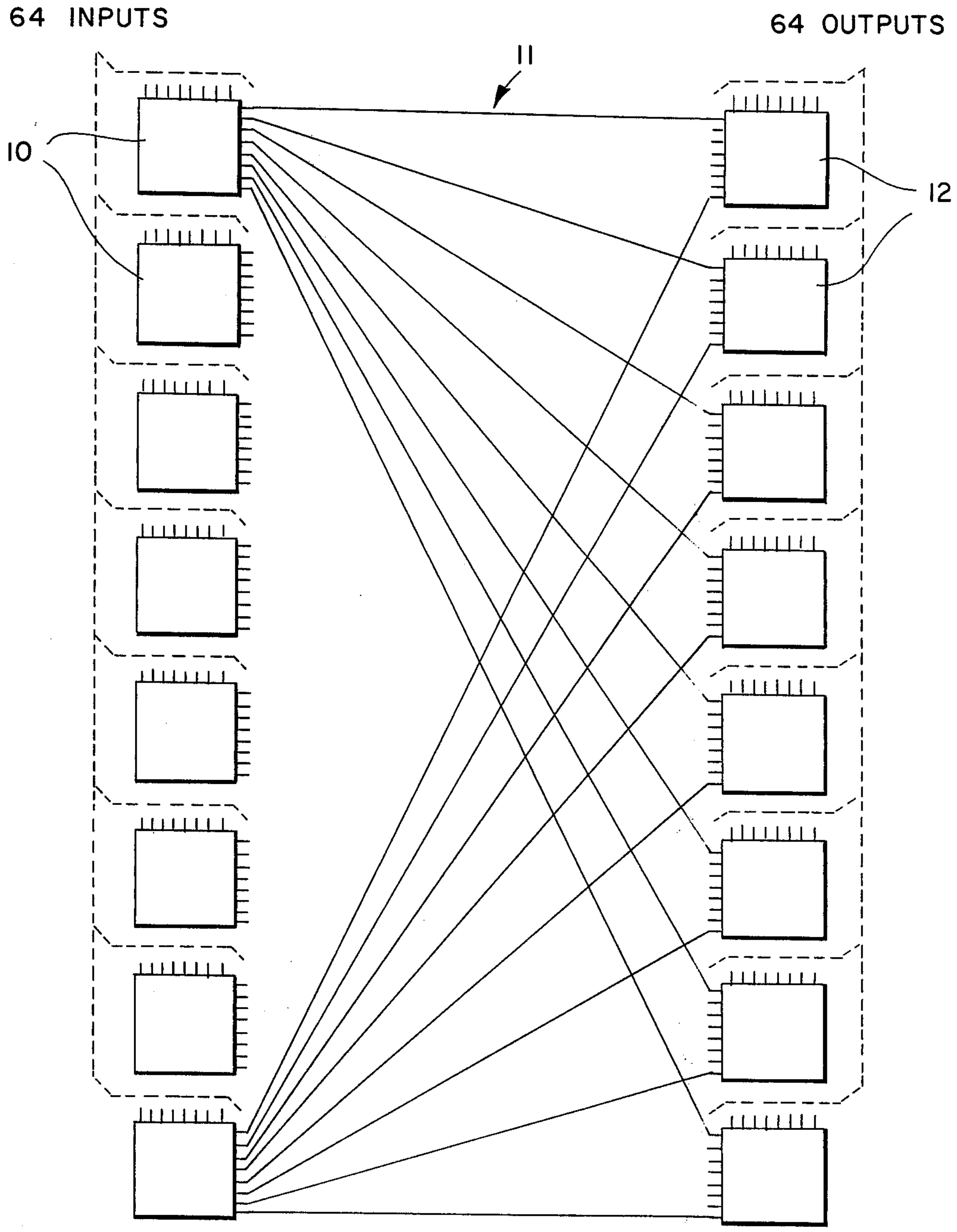
FIG. 1 is a diagram of a typical two-stage switching network to which the principles of the invention apply.

Referring now to FIG. 1, an exemplary two-stage switching network is shown diagrammatically, the network having input switches 10, interstage linkage 11, and output switches 12. Each of the switches is shown to be an 8 × 8 coordinate switch, which would have 64 crosspoints. Eight input circuits connect to each input switch and eight output circuits connect to each output switch, for a total of 64 input circuits and 64 output circuits. A circuit from each horizontal bus on each input switch connects through interstage linkage 11 to a horizontal bus on an output switch. To avoid cluttering the drawing, the circuits in the interstage linkage are only partially shown in FIG. 2. The interstage linkage is arranged so that the several horizontal buses on each input switch connect to horizontal output buses on different output switches. By closing two crosspoints, one in an input switch and one in an output switch, a circuit can be established from any input circuit to any output circuit.

Each crosspoint in the coordinate switches consists of that number of contacts required to connect the number of wires in the circuits being switched. For example, if two-wire circuits are being switched, each crosspoint consists of two contacts or their equivalent. Individual links in interstage linkage 11 are represented by single lines for clarity, but it should be understood that each link also consists of the number of wires being switched. Theoretically, switching networks can be built that switch circuits having any number of wires. In the telephone industry, switched circuits typically consist of two or four wires.

Note that the links in interstage linkage 11 do not comprise parallel sets of conductors that can be readily grouped into cables. Circuits from any given switch in a given stage fan out to a plurality of different switches in the next stage. Heretofore it has been necessary to fabricate interstage networks by installing each link individually, or by grouping the links in a manually formed cable. The ends of the conductors in the individual or cabled links were then manually terminated by soldering or wire-wrapping. These procedures are labor intensive, and may not seem unreasonable for the exemplary switching network shown in FIG. 1; however, actual networks may have hundreds or thousands of inputs and outputs, upwards of four stages of switches, and interstage linkages between each adjacent pair of switching stages. Therefore, it is desirable to fabricate interstage linkages by a more economical method than has been available previously.

Figure 2:
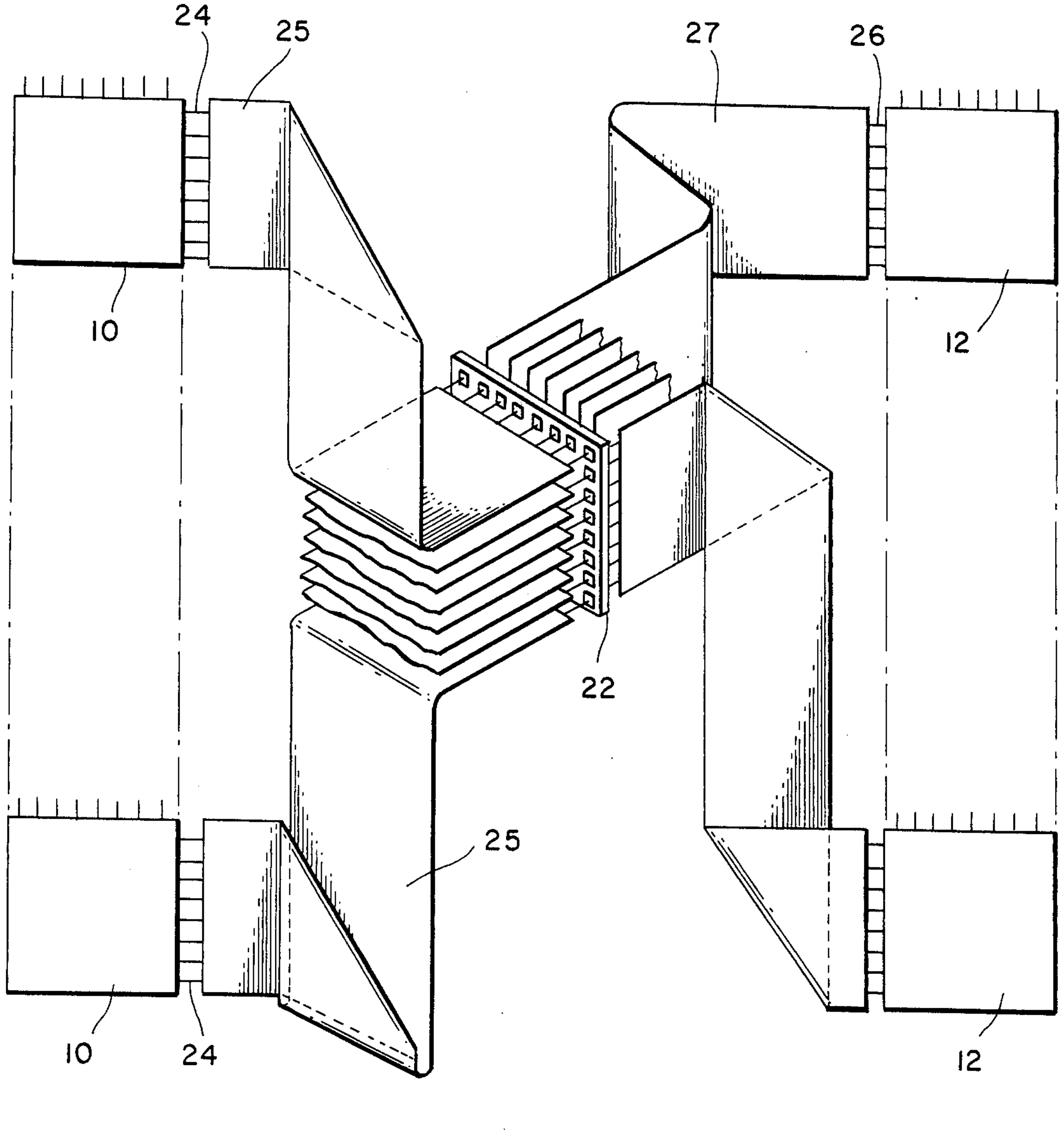
FIG. 2 shows the invention used in the two-stage switching network of FIG. 1.
Figure 3:
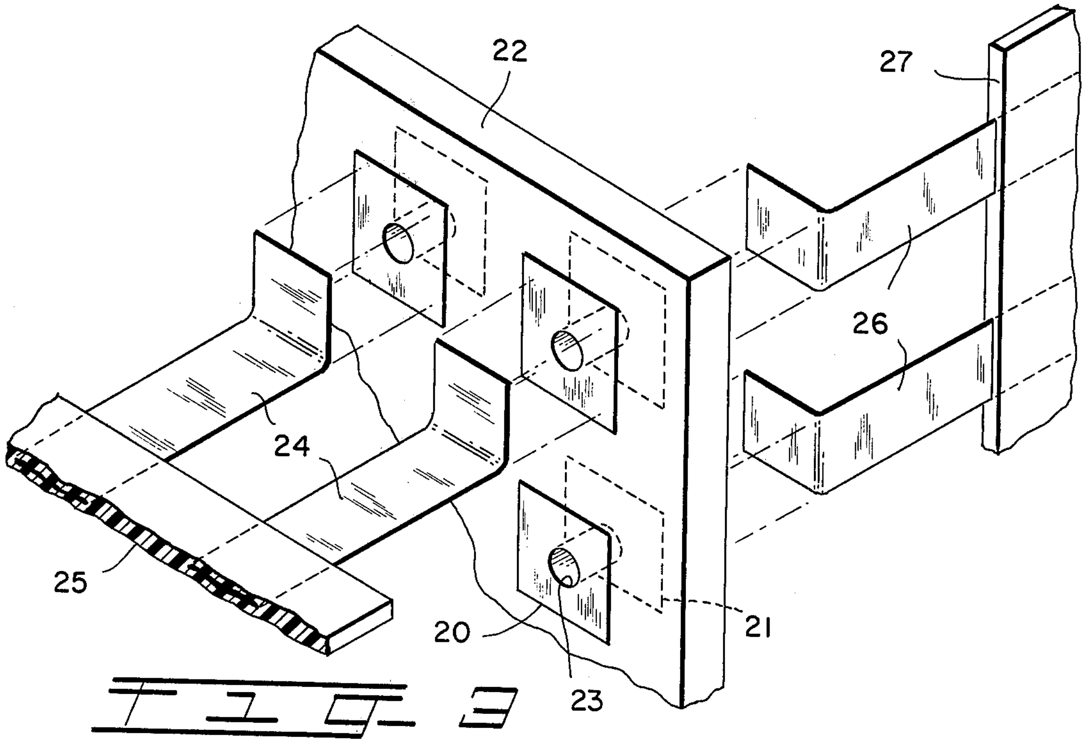
FIG. 3 shows a portion of the interstage linkage of FIG. 2 in more detail for one-wire circuits.

FIG. 2 shows the switching network of FIG. 1 with an interstage linkage fabricated according to the principles of the invention. For clarity, input switches 10 and output switches 12, and the cables in interstage linkage 11 are only partially shown. FIG. 3 shows a portion of interstage linkage 11 in more detail for a one-wire switching network. Corresponding rectangular arrays of contact pads 20 and 21 are fabricated on opposite side of matrix board 22. Opposing contact pads are connected by through-connections 23, such as plated-through holes. Such a matrix board can be easily fabricated using well-known printed circuit processes. Conductors 24 from each of cables 25 are bonded to rows of contact pads 20 on one side of matrix board 22. Conductors 26 from each of cables 27 are bonded to columns of contact pads 21 on the other side of matrix board 22. Each cable 25 is connected to the output terminals of an input switch 10. Each cable 27 is connected to the input terminals of an output switch 12. It can be seen that conductors 24 in each cable 25 are connected through matrix board 22 to conductors 26 in different cables 27. Cables 25 and 27 are shown to be flat-flexible cables having flat conductors sandwiched between two layers of insulation, the end of each conductor 24 and 26 being formed at a right angle to facilitate bonding, but other types of cables can be used if the conductors are properly arrayed at the ends of the cables for bonding to contact pads 20 and 21. The bonds between conductors 24 and 26 and contact pads 20 and 21 can readily be made by well-known methods, such as reflow soldering, welding, or other means wherein all the conductors at one end of a particular cable are connected to their corresponding contact pads simultaneously, and, therefore, at lower cost than with previous methods of terminating individual or manually cabled conductors.

If reflow soldering is used, contact pads 20 and 21 and the ends of conductors 24 and 26 coated with solder before bonding. During the bonding step, the conductors in one of cables 25 or 27 are positioned against their contact pads and heat is applied by a heated bonding tool or from a radiant energy source to reflow the solder coating and thereby bond the conductors to the contact pads.

Looking at the overall network in FIG. 2, it can be seen that the output terminals on a particular switch 10 are connected through conductors 24 in its associated cable 25 through matrix board 22 and conductors 26 in different cables 27 to input terminals on different output switches 12. Thus, the switching network diagrammed in FIG. 1 is implemented, using two-dimensional switches and flat cables.

Conductors 24 and 26 in cables 25 and 27 can be attached to terminals or contacts on switches 10 and 12 by any convenient method. Again, reflow soldering methods can conveniently be used to connect all the conductors at one end of a particular cable to their corresponding switch terminals simultaneously.

It should be realized that the switches 10 and 12 shown in FIG. 2 can be mounted in many relative orientations in an actual switching network. The lengths of cables 25 and 27, the position of matrix board 22, and the twisting and folding of cables 25 and 27 can be arranged accordingly.

Figure 4:
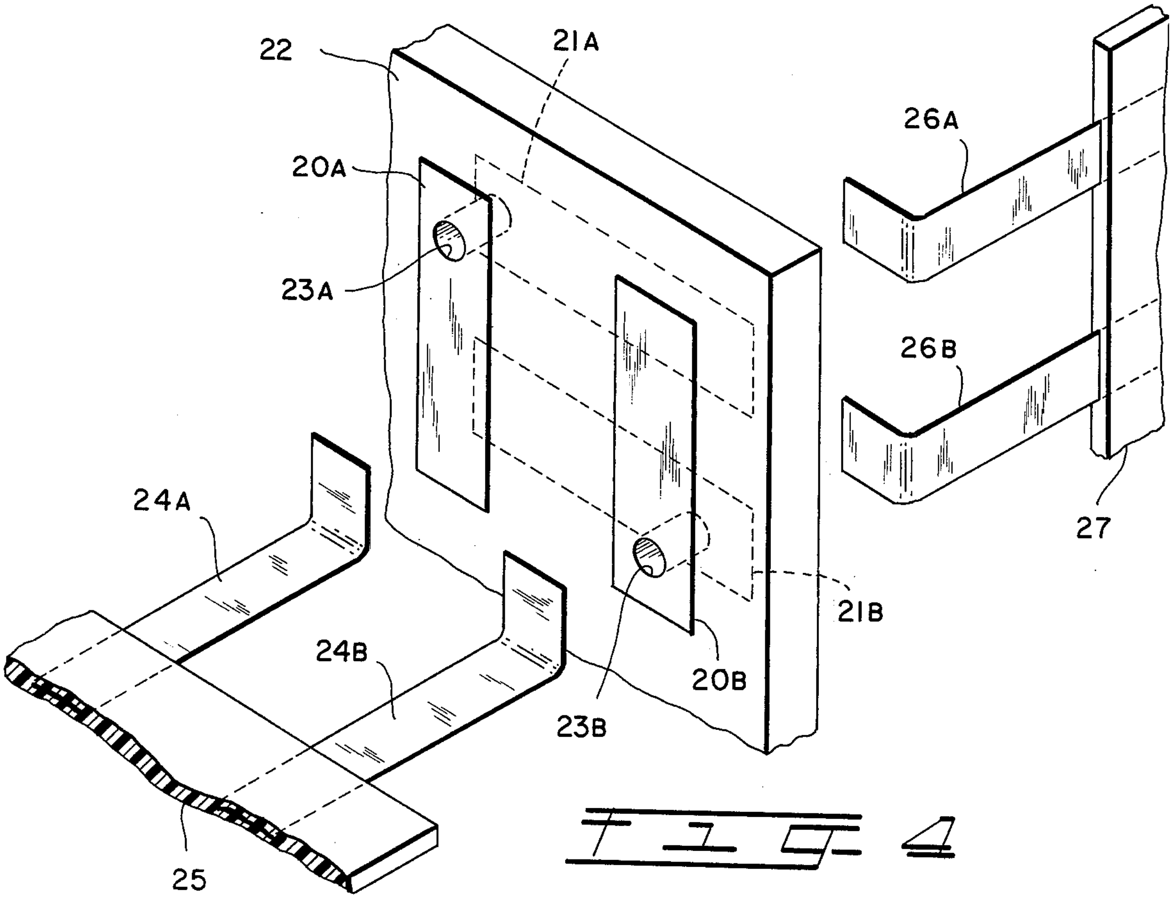
FIG. 4 shows a portion of an interstage linkage for two-wire circuits.

FIG. 4 shows the invention used in an interstage linkage for a two-wire switching network. Pairs of contact pads 20A and 20B are fabricated in a rectangular array on one side of matrix board 22, and pairs of contact pads 21A and 21B are fabricated on the other side of matrix board 22. Opposing contact pads 20A and 21A are connected, and opposing contact pads 20B and 21B are connected by through-connections 23A and 23B, respectively. Conductor pairs 24A and 24B in cables 25 connect to rows of pairs of contact pads 20A and 20B; conductor pairs 26A and 26B in cables 27 connect to columns of pairs of contact pads 21A and 21B. Thus, adjacent paired conductors in a cable 25 are connected to adjacent paired conductors in a cable 27, with the several pairs of conductors in a cable 25 each being connected to pairs of conductors in different cables 27. The basic interstage linkage pattern shown in FIG. 1 can, therefore, be implemented for two-wire links. Clearly, the basic principles of the invention can be extended for use with interstage linkages having any number of wires in their links.

Figure 5:
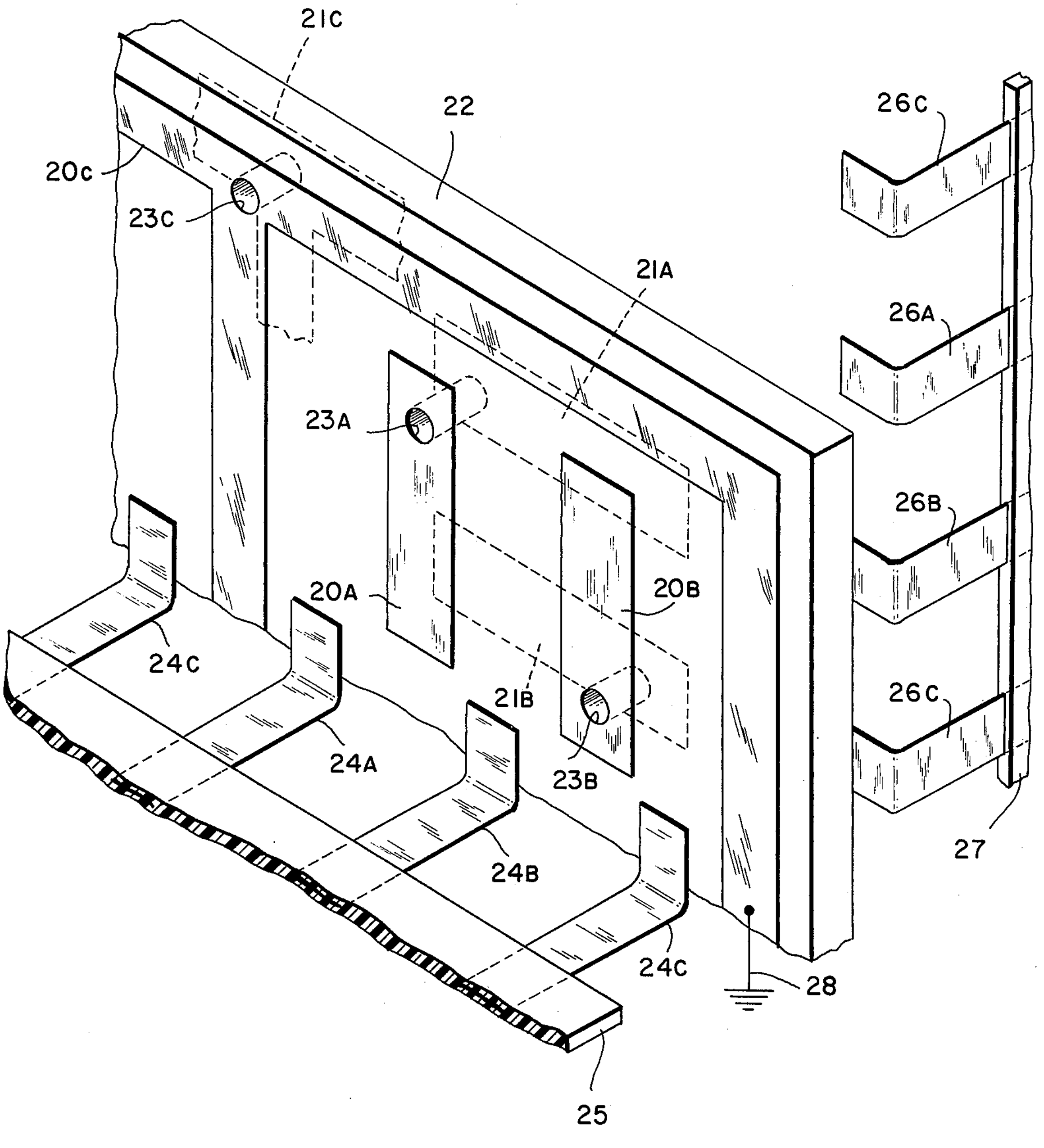
FIG. 5 shows a portion of an interstage linkage for two-wire circuits having additional interleaved common wires.

FIG. 5 shows the invention used in an interstage linkage similar to that shown in FIG. 4 but having the additional feature that pairs of conductors in cables 25 and 27 are interleaved between common wires 24C and 26C. Such common wires are often desirable in communications circuits to reduce crosstalk between adjacent pairs. Common wires 24C and 26C are interconnected by common networks 20C and 21C, respectively, on matrix board 22. Common networks 20C and 21C can be connected by through-connections, such as 23C, if desired. Thus, all common wires 24C and 26C and common planes 20C and 21C can be connected together. Typically, the common planes 20C and 21C and common wires 24C and 26C are connected to circuit ground, as symbolized at 28, or to a potential source (not shown).

Figure 6:
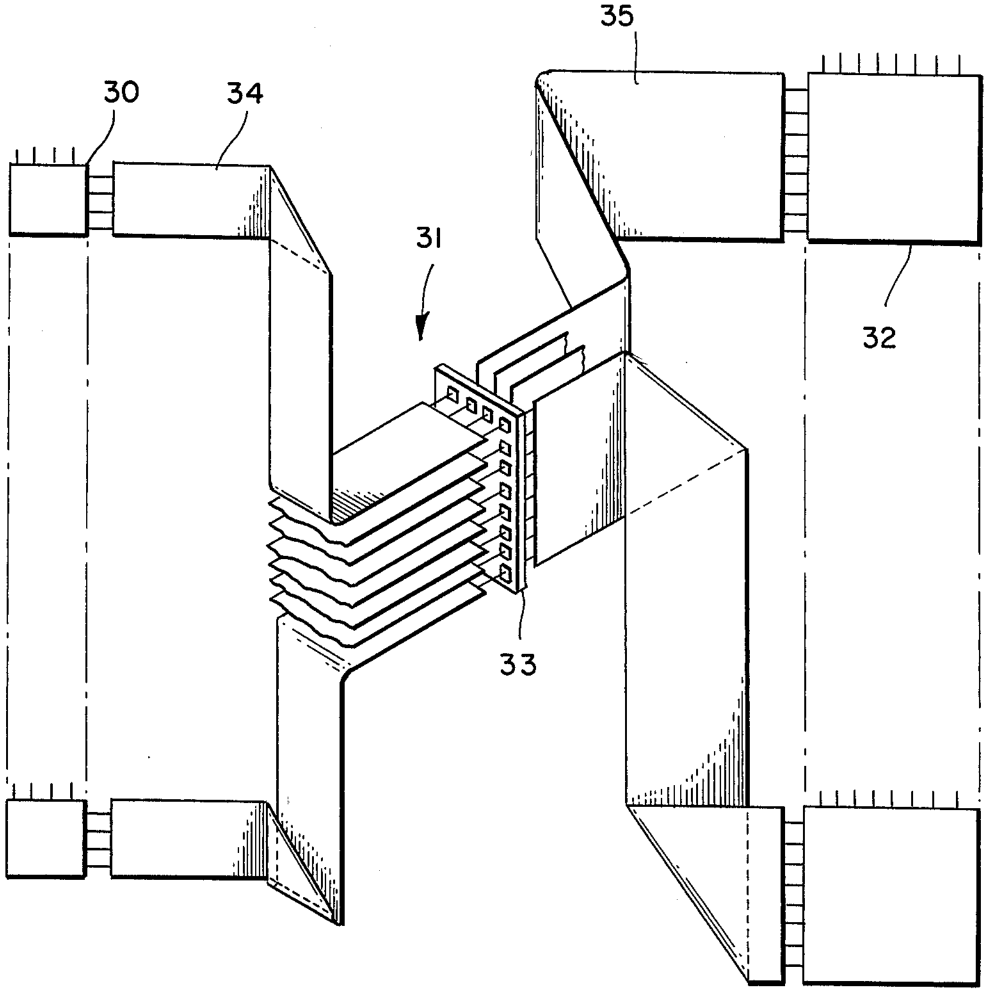
FIG. 6 shows the invention used in another two-stage switching network.

FIG. 6 partially shows a two-stage switching network using the invention having 4 × 4 coordinate switches 30 connected through interstage network 31 to 8 × 8 coordinate switches 32. Matrix board 33 is fabricated with contact pads in 8-row × 4-column arrays. Four-circuit cables 34 connect 4 × 4 switches 30 to rows of contact pads on one side of matrix board 33, and eight-circuit cables 35 connect 8 × 8 switches 32 to the other side of circuit board 33. Opposing contact pads on matrix board 33 are connected. From this example, it will be apparent that interstage linkages for switching networks having different switch sizes in different stages can easily be fabricated by using the principles of the invention.

In the above descriptions and the drawings, the coordinate switches have been shown to be square, the number of inputs equaling the number of outputs. Referring again to FIG. 1, it can be seen that the number of inputs on each of switches 10 can be any number other than 8, and the number of outputs on each of switches 12 can be any number other than 8, without changing the configuration of interstage linkage 11. Clearly, rectangular switches, in which the number of inputs does not equal the number of outputs, can also be used with the invention.

It will also be apparent, as broadly stated above, that the invention can be used to provide an interstage linkage to interconnect two stages of devices in which the first stage consists of $m$ devices each having $n$ output circuits and the second stage consists of $n$ devices each having $m$ input circuits, each circuit having $s$-wires. For example, the switching networks described above can be described in this form: in the switching network of FIGS. 1 and 2, $m = 8, n = 8$, and $s$ is the number of wires in the circuits being switched; and in the switching network of FIG. 6, $m = 8, n = 4$, and $s$ is the number of wires in the circuit being switched.

One skilled in the art may make changes and modifications to the embodiments of the invention disclosed herein, and may devise other embodiments, without departing from the spirit and scope of the invention.

What is claimed is:

1. In an electrical network having a plurality of first devices and a plurality of second devices, the devices having input and output terminals, an interstage linkage for connecting the first devices to the second devices, which comprises:

a plurality of first flat cables, each connected at one end to the output terminals of an associated first device;

a plurality of second flat cables, each connected at one end to the input terminals of an associated second device, the remaining ends of the first cables being stacked parallel to each other, the remaining ends of the second flat cables being stacked parallel to each other and substantially perpendicular to the plane of the first cables, the stacked cables being positioned to place the end of each conductor in the second cables substantially opposite the end of a corresponding conductor in the first cables; and means for connecting each conductor in the second cables to its corresponding opposed conductor in the first cables.

2. In a switching network having $m$ first switches each having $n$ $s$-wire outputs and $n$ second switches, each having $m$ $s$-wire inputs, where $m$, $n$, and $s$ represent integers characterizing the switching network, an interstage linkage for connecting the switches, which comprises:

$m$ first flat cables, each having $n$ $s$-wire circuits connected at one end to the outputs of an associated first switch;

$n$ second flat cables, each having $m$ $s$-wire circuits connected at one end to the inputs of an associated second switch; the remaining ends of the first flat cables being stacked in spaced relation, the distance between adjacent first flat cables being substantially the distance between adjacent $s$-wire circuits in the second flat cables; the remaining ends of the second flat cables being stacked in spaced relation perpendicular to the plane of the first flat cables, the distance between adjacent second flat cables being substantially the distance between adjacent $s$-wire circuits in the first flat cables, the stacked cables being placed to position the end of each circuit in the second cables substantially opposite the ends of a corresponding circuit in the first cables; and means for connecting the conductors of each circuit in the second cables to their corresponding conductors in the opposing circuit in the first cables.

3. An interstage linkage for connecting $m$ $n$-circuit devices in a first stage to $n$ $m$-circuit devices in a second stage, each circuit having $s$ terminals, the interstage linkage providing $m$ X $n$ $s$-wire links, each connecting the s terminals of the $i^{th}$ circuit of the $j^{th}$ device in the first stage to the corresponding s terminals of the $j^{th}$ circuit of the $i^{th}$ device in the second stage, where $m$, $n$, $s$, $i$ and $j$ are integers, and $1 \leq i \leq m$ and $1 \leq j \leq n$; which comprises:

a matrix board having a first $m$-row by $n$-column array of terminal groups on a first side and a second $m$-row by $n$-column array of terminal groups on a second side opposing the first side, each terminal group in the second array opposing a corresponding terminal group in the first array, the terminal groups in the first array each containing $s$ terminals positioned along an axis parallel to the rows, the terminal groups in the second array each containing $s$ terminals positioned along an axis parallel to the columns, each terminal in each group in the first array being connected to a corresponding one of the terminals in the opposing group of the second array;

*m* cables each having *n X s* conductors connecting the *n X s* terminals of one of the *m* first-stage devices to corresponding ones of the *n X s* terminals in a row of terminal groups on the first side of the matrix board; and

*n* cables each having *m X s* conductors connecting the *m X s* terminals of one of the *n* second-stage devices to corresponding ones of the *m X s* terminals in a column of terminal groups on the second side of the matrix board.

4. The interstage linkage according to claim 3 wherein the matrix board comprises a planar member having two opposed major surfaces, the terminals on the matrix board are contact pads substantially coplanar with the surfaces, and each cable comprises a plurality of substantially parallel conductors supported by at least one web of insulating material.

5. The interstage linkage according to claim 3 wherein the *m* and *n* cables each have at least one additional conductor connected to additional terminals on their respective sides of the matrix board, the additional terminals being interconnected to thereby interconnect all the additional conductors.

6. An interstage linkage for a switching network having a plurality of first switches connected by the interstage linkage to a plurality of second switches, which comprises:

a matrix board having a first rectangular array of contact pads on a first surface and a second rectangular array of contact pads on a second surface, each contact pad in the first array being connected to a corresponding contact pad in the second array;

a first group of multi-conductor cables, each cable connecting the ouput terminals of one of the first switches to corresponding contact pads of a row in the first array; and a second group of multi-conductor cables, each cable connecting the input terminals of one of the second switches to corresponding contact pads of a column in the second array.

7. A switching network comprising:

*m* first switches, each terminated in a flat cable having *n s*-wire circuits;

*n* second switches, each terminated in a flat cable having *m s*-wire circuits, *m*, *n* and *s* representing integers characterizing the switching network;

the remaining ends of the *m* cables from the first switches being stacked in spaced relation, the remaining ends of the *n* cables from the second switches being stacked in spaced relation perpendicular to the first cables, the stacked cables being positioned to place the end of each circuit in the second cables substantially opposite the end of a corresponding circuit in the first cables; and means for connecting the conductors of each circuit in the second cables to their corresponding conductors in the opposing circuit in the first cables.

8. The switching network according to claim 7 wherein the connecting means further comprises:

a matrix board having a first *m*-row by *n*-column array of terminal groups on a first side and a second *m*-row by *n*-column array of terminal groups on a second side, each terminal group in the second array opposing a corresponding terminal group in the first array, the terminal groups in the first array each containing s terminals positioned along an axis parallel to the rows, the terminal groups in the second array each containing *s* terminals positioned along an axis parallel to the columns, each terminal in each group in the first array being connected to a corresponding one of the terminals in the opposing group of the second array; the conductors in each cable from one of the first switches being connected to a row of terminals on the first side of the matrix board, the conductors in each cable from one of the second switches being connected to a column of terminals on the second side of the matrix board.

* * * * *